(No Model.)

G. W. DEANE.
SEED PLANTER ATTACHMENT FOR PLOWS.

No. 567,335. Patented Sept. 8, 1896.

Witnesses

Inventor,
George W. Deane,
By *Attorney*

UNITED STATES PATENT OFFICE.

GEORGE W. DEANE, OF RIVERSIDE, CALIFORNIA, ASSIGNOR TO NELLIE DEANE, OF SAME PLACE.

SEED-PLANTER ATTACHMENT FOR PLOWS.

SPECIFICATION forming part of Letters Patent No. 567,335, dated September 8, 1896.

Application filed May 27, 1896. Serial No. 593,331. (No model.)

*To all whom it may concern:*

Be it known that I, GEORGE W. DEANE, a citizen of the United States, residing at Riverside, in the county of Riverside and State of California, have invented certain new and useful Improvements in Seed-Planter Attachments for Plows; and I do declare the following to be a full, clear, and exact description of the invention, such as will enable others skilled in the art to which it appertains to make and use the same.

My invention has relation to attachments for plows; and the object is to provide a device of this kind for planting or distributing a fertilizer in the furrow at the same time the plowing is going on; and to this end the novelty consists in the construction, combination, and arrangement of the same, as will be hereinafter more fully described, and particularly pointed out in the claims.

In the accompanying drawings the same figures of reference indicate the same parts of the invention.

Figure 1:
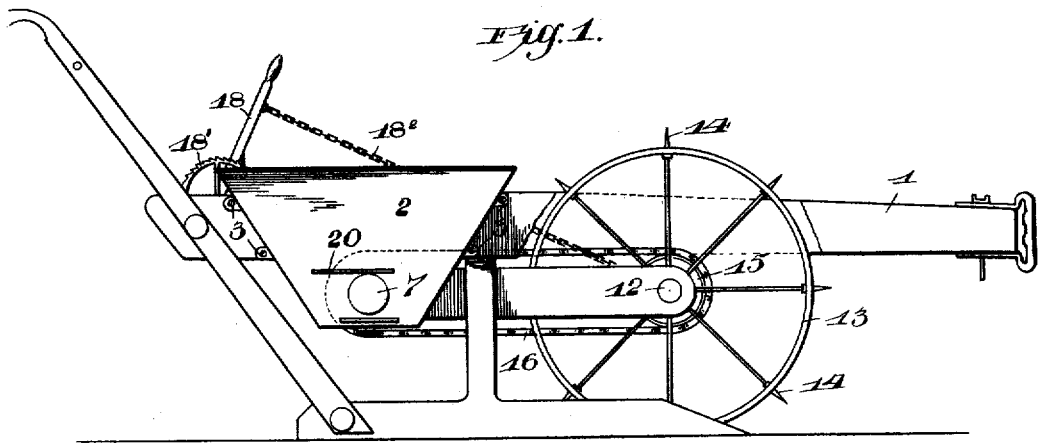
Figure 2:
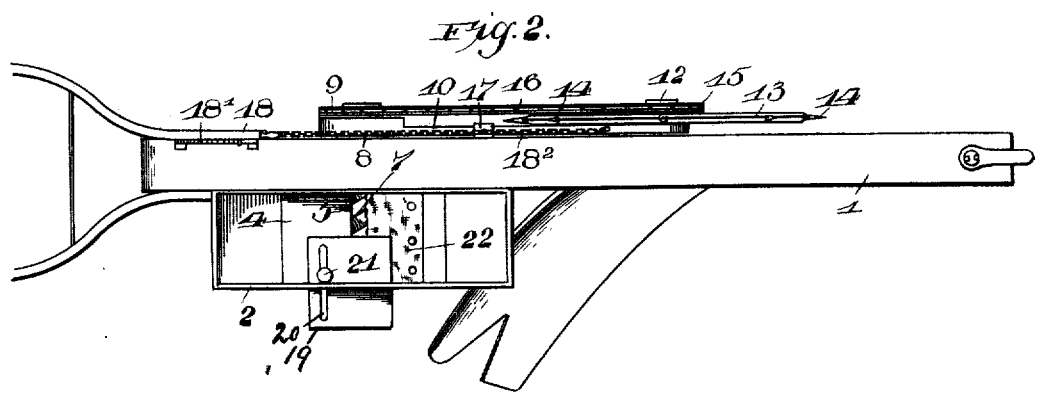
Figure 3:
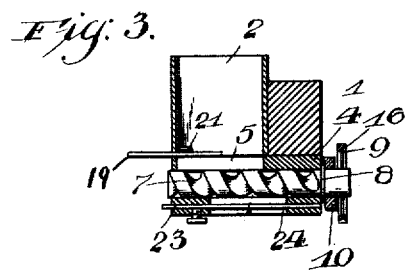
Figure 4:
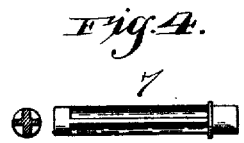

Figure 1 is a side elevation of an ordinary plow with my improved seed-dropper and fertilizer attachment secured thereto. Fig. 2 is a top plan view of the same. Fig. 3 is a section through the seed-hopper, and Fig. 4 is a modification of the feed device.

1 represents the beam of an ordinary plow, and to one side thereof near its rear end is removably secured the hopper 2 by bolts 3 3 3. The hopper-bottom 2 is provided with a transverse feed-slot 5, and immediately below said slot is a circular recess 6, communicating with said slot, and in said circular recess is located a rotating auger-shaped feed-shaft 7, the end of which projects through the side of the hopper farthest from the plow-beam, while its opposite end also projects through the side of the hopper nearest the beam, and it is provided with a collar 8, and its extreme end has secured to it a sprocket-wheel 9, and between said collar and sprocket-wheel is mounted one end of a pivoted bar 10, so that said shaft 7 revolves freely in it. The other end of said bar 10 is provided with a counter-shaft 12, on which rotates freely a wheel 13, formed with radial spurs 14, and a sprocket-wheel 15, around which passes a sprocket-chain 16, which rotates the sprocket-wheel 9 and feed-shaft 7.

17 is a bracket secured to the side of the beam between the two sprocket-wheels, and it forms a guide for the vertical motion of the pitman to compensate for the vertical movement of the wheel in traveling over the ground.

18 is a hand-lever pivoted to the side of the beam, and it is provided with an arc-shaped rack 18', by which it can be locked in any position. This lever 18 is provided with a chain or connecting-rod $18^2$, connecting it with the pitman 10, so as to raise and lower the wheel, when desired, in going from one part of the field to another or from the field to the barn and vice versa.

19 is a slide in the bottom of the hopper, and it is provided with a slot 20, in which is a set-screw 21, by means of which it can be adjusted to regulate the length of the feed-slot 5.

22 is a strip of cloth, rubber, or any suitable flexible material secured to one side of the feed-slot 5, its free end extending downwardly in contact with the periphery of the feed-shaft to wipe off the surplus seed or fertilizer from the spiral grooves in the feed-shaft after they have become filled, and thereby insure a continuous, regular, and uniform supply of the same.

A similar slide 23 moves in the bottom of the hopper to cover or regulate the size of the slot 24, and this slot may be entirely closed and the seed discharged by the feed-shaft 7 at the end of the recess, or it may be only partially closed, so as to divide the distribution of the seed or fertilizer between the opening in the slot 24 and the end of the recess, at will.

In the modification I have shown straight grooves in the feed-shaft instead of the spiral ones first described.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. The combination with a plow-beam, carrying a hopper having upper and lower alined feed-slots and a transverse orifice between them, of the spirally-fluted feed-shaft, rotating in said orifice and provided with a collar 8, sprocket-wheel 9, and pivoted bar 10, having counter-shaft 12, walking-wheel 13 journaled thereon, carrying sprocket-wheel 15, and the sprocket-chain 16, substantially as and for the purpose set forth.

2. A plow-beam carrying a hopper formed with a circular recess, slots 5 and 24, adjustable slides 19 and 23, and flexible strips 22, in combination with the fluted feed-shaft 7, rotating in said recess, and provided with the collar 8, sprocket-wheel 9, and the pivoted bar 10 carrying a walking-wheel 13, sprocket-wheel 15, and sprocket-chain 16, substantially as and for the purpose set forth.

In testimony whereof I hereunto affix my signature in presence of two witnesses.

GEORGE W. DEANE.

Witnesses:
C. A. CALDWELL,
ROBERT DUNCAN.